United States Patent [19]

Cobb et al.

[11] 4,216,795
[45] Aug. 12, 1980

[54] POSITION FEEDBACK ATTACHMENT

[75] Inventors: Clyde E. Cobb, Lakeview Terrace; Kim L. Coakley, Castaic, both of Calif.

[73] Assignee: Textron, Inc., Providence, R.I.

[21] Appl. No.: 972,766

[22] Filed: Dec. 26, 1978

[51] Int. Cl.³ .............................................. F15B 13/16
[52] U.S. Cl. ................................ 137/554; 91/363 R; 91/365; 137/625.64; 403/252
[58] Field of Search ............... 91/363 R, 363 A, 365; 137/554, 625.64; 403/353, 252, 259, 260, 261

[56] References Cited

U.S. PATENT DOCUMENTS

| | | | |
|---|---|---|---|
| 3,143,042 | 8/1964 | Borgeson et al. | 91/363 R |
| 3,438,306 | 4/1969 | Kazmarek | 91/363 A |
| 3,986,780 | 10/1976 | Nivet | 403/353 |
| 4,150,686 | 4/1979 | Elsherif et al. | 91/363 A X |

*Primary Examiner*—Gerald A. Michalsky
*Attorney, Agent, or Firm*—Nilsson, Nobbins, Dalgarn, Berliner, Carson & Wurst

[57] ABSTRACT

An electrohydraulic servovalve having a pair of linear, variable, differential transducers (LVDT) affixed thereto in side by side relationship. A spool valve driven by the electrohydraulic servovalve is connected to the movable core in each of the LVDTs so that as the spool valve moves, each of the LVDTs develops a position output signal representative of the position of the spool. The connecting mechanism between the driven spool valve and the LVDT cores is a rod which is attached to the spool and includes a pair of flanges at the opposite end defining a groove therebetween. A pair of plates spaced apart at the center define a slot centrally thereof. The plates at the slot are spaced apart so that the width of the two plates plus the space between them is greater than the width of the groove in the rod. The outermost flange is formed so that it will fit through the slot in the plates. The two cores of the LVDTs include rods which are in turn permanently affixed at each end of the plates. In assembly, the plates are fitted over the end of the rod attached to the spool vavle and the centers are compressed slightly and the entire assembly is turned 90° to lock the plates in position in a zero backlash configuration. The LVDTs are then assembled in place with the cores thereof inserted into the coils and the housing is attached to the body of the electrohydraulic servovalve.

8 Claims, 8 Drawing Figures

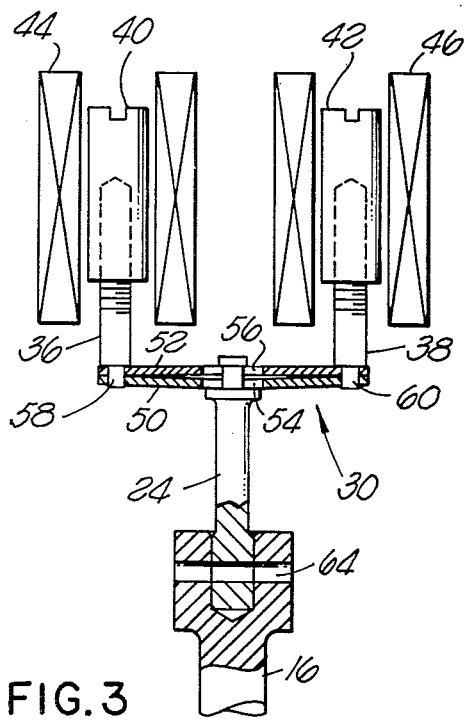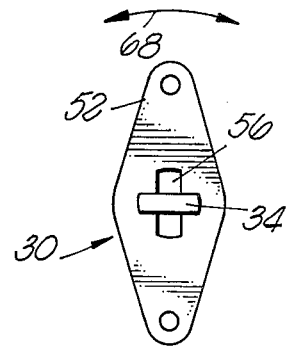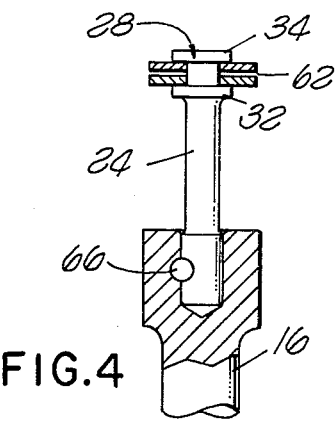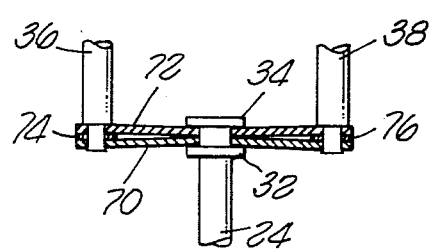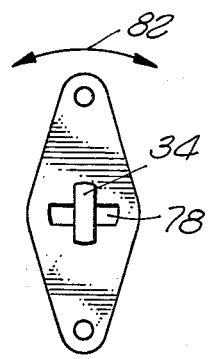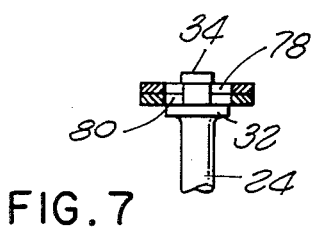

POSITION FEEDBACK ATTACHMENT

BACKGROUND OF THE INVENTION

The invention relates generally to the electrohydraulic servovalves and more particularly to means for attaching a pair of transducers to a single driving element for use with electrohydraulic servovalves.

When a plurality of transducers such as LVDTs, potentiometers or the like are to be moved simultaneously by a single driven element, several problems immediately present themselves. The assembly of the plurality of transducers to be driven by the single driven element must be relatively simple to accomplish and must also be capable of being easily disassembled to replace the transducer in the event of malfunction thereof. Thus, there can be no permanent attachment between the transducers and the driven element. If such a permanent attachment is required then such may necessitate discarding of the transducer or at least a major part thereof in the event of a malfunction.

Since the transducers in such a configuration normally provide duplicate signals for use in various functions with an overall system, it is important that the transducers once properly adjusted, reproduce output signals consistently and track each other precisely. If such does not occur, then the redundancy required in the plurality of output signals is not accomplished. To provide this consistency there must be zero backlash in the mechanism interconnecting the driven element to the transducers.

The best prior art known to applicants are U.S. Pat. Nos.: 335,892, Cosford et al, Feb. 9, 1886; 632,562, Godfrey, Sept. 5, 1899; 1,660,982, Woolson, Feb. 28, 1928; 3,532,109, J. Smith, Oct. 6, 1970; 3,438,306, Kazmarek, Apr. 15, 1969; 3,143,042, Borgeson et al, Aug. 4, 1964; 3,986,780, Nivet, Oct. 19, 1976; 4,150,686, El Sherif et al, Apr. 24, 1979.

SUMMARY OF THE INVENTION

A multiposition attachment between a plurality of transducers and a single driving element in accordance with the present invention includes rod means for attachment to the driving element, a plate means, link means permanently affixed at each end of the plate means for attachment to the transducer means and means removably centrally attaching the plate means to the rod means.

BRIEF DESCRIPTION OF THE DRAWINGS

FIGS. 3, 4 and 5 are a schematic illustration of one form of the attachment mechanism constructed in accordance with the principles of the present invention; and FIGS. 6, 7 and 8 are schematic representations of an alternative embodiment of the attachment mechanism.

DETAILED DESCRIPTION OF THE INVENTION

Figure 1:
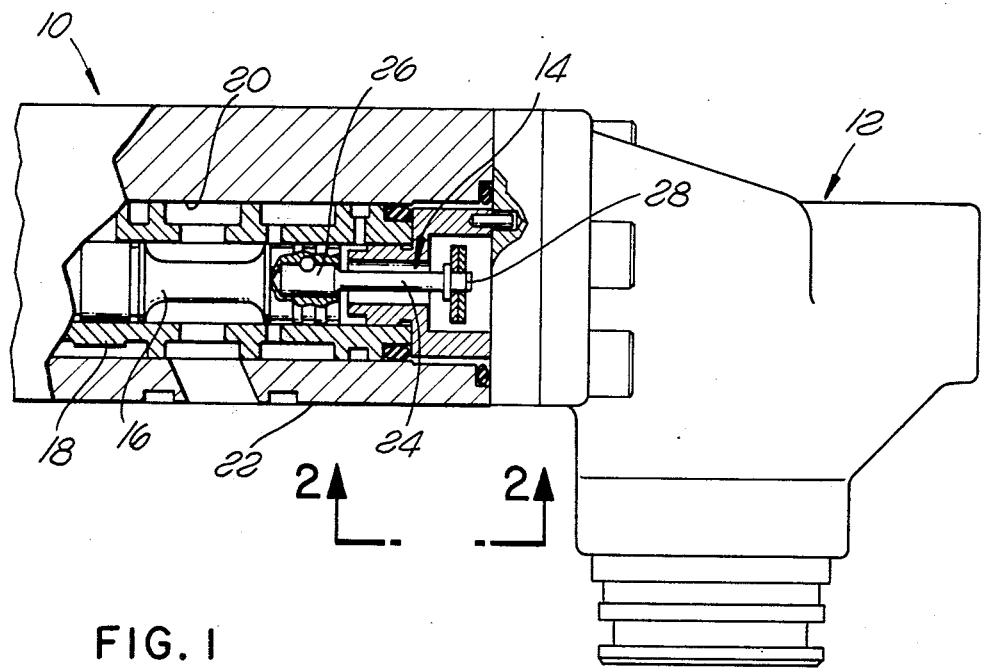
FIG. 1 is a schematic representation, partly broken away and partly in cross section illustrating an electrohydraulic servovalve constructed in accordance with the principles of the present invention.
Figure 2:
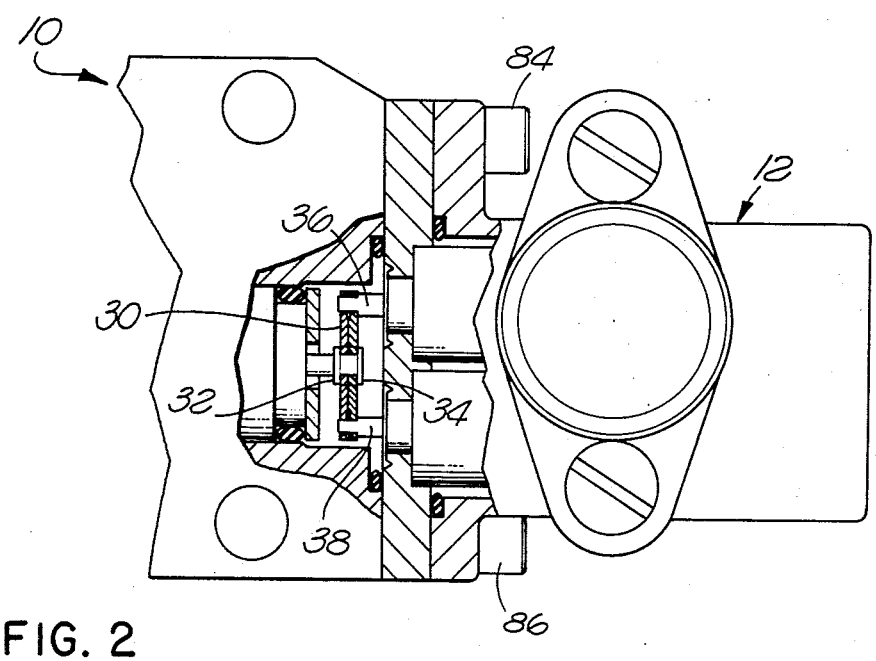
FIG. 2 is a bottom elevational view partially broken away of the structure illustrated in FIG. 1 with specific details taken about the line 2—2 of FIG. 1.

As is illustrated in FIGS. 1 and 2, to which reference is hereby made, an electrohydraulic servovalve 10 has affixed to the housing thereof a pair of transducers such as linear variable differential transducers (LVDTs) which are interconnected by an attachment mechanism 14 to the electrohydraulic servovalve 10. As will be recognized by those skilled in the art, electrical signals are applied to the electrohydraulic servovalve and in response thereto, pressure signals are generated which are applied to a spool valve to control the flow of fluid from a source thereof to a load such as an actuator or the like. As the spool valve moves to thus control the load it is desirable to produce position indicating signals which may be used for feedback purposes or other applications depending upon the particular system in which the electrohydraulic servovalve is being used. These signals may be generated by an LVDT or any other type of feedback mechanism known to the art such, for example, as a potentiometer. It is important that the attachment mechanism be such that all movement of the spool valve is immediately transmitted to the transducer and reflected therein by a change in the output electrical position signal.

The overall operation and function of electrohydraulic servovalves and transducers such as LVDTs and potentiometers are well known to those skilled in the art and therefore a detailed description of the operation thereof is not deemed necessary for an understanding of the invention constructed in accordance with the principles of the present invention.

As is illustrated more specifically in FIG. 1, a spool valve 16 is slidably disposed within a sleeve 18 disposed within a bore 20 of a housing 22. As above referred to, the spool valve 16, in moving, controls the flow of hydraulic fluid from a source under pressure thereof (not shown) to appropriate loads (not shown) as is well known to those skilled in the art. The attachment mechanism 14 includes a spool link or rod 24 which is non-rotatably attached to the spool valve 16 at a first end 26 thereof. At the opposite end 28 thereof there is provided a connection to the transducer 12. This connection includes plate means 30 which is held in place on the end 28 of the rod 24 by flanges 32 and 34. LVDT link means such as rods 36 and 38 are connected to opposite ends of the plate means 30 and to the LVDTs. Through this attachment mechanism, as the spool 16 moves within the sleeve 18, such movement is transmitted through the rod 24, the plate 30 and the rods 36 and 38 to the transducers 12 to generate the position indicating signal.

In reference to FIGS. 3 through 5, a first embodiment of an attaching mechanism constructed in accordance with the principles of the present invention is illustrated. As is therein shown the spool valve 16 is connected by the spool link 24 and the plate means 30 to the LVDT links 36 and 38. The LVDT link 36 is connected to the LVDT core 40, while the link 38 is connected to the LVDT core 42. The cores 40 and 42 are disposed within LVDT coils 44 and 46. The cores 40 and 42 are threadably attached to the links 36 and 38 for adjustment after assembly to position the cores at the null point of the LVDTs as is well known to those skilled in the art.

The plate means 30 is constructed of a first plate 50 and a second plate 52. Each of the plates 50 and 52 define a centrally disposed elongated slot or aperture 54 and 56, respectively. As is illustrated in FIG. 3, the plates 50 and 52 are formed in such a manner that the central portions thereof are offset somewhat with respect to the ends thereof to thereby cause the plates to be spaced apart at the central portions thereof. The plates 50 and 52 also define apertures at opposite ends thereof within which are permanently attached the ends 58 and 60 of the links 36 and 38, respectively. The flanges 32 and 34 define a groove about the end 28 of the rod 24 within which the plates 50 and 52 are received. The space 62 provided by the offset in the plates 50 and 52 is such that when the plates are not attached to the rod 24, the dimension defined by the thickness of the plates 50 and 52 and the space 62 therebetween is greater than the dimension between the opposed inner surface of the flanges 32 and 34. By providing the dimension between the outer surfaces of the plates 50 and 52 greater than the distance between the inner surfaces of the flanges 32 and 34, the spring tension is provided when the plates are secured in position to totally eliminate any backlash which might occur as a result of this interconnection.

To further preclude the occurrence of any backlash the spool 16 and the rod 24 define an opening common to each as shown at 64 which is disposed transverse to the longitudinal axis of the rod and the spool. A pin 66 is received within the opening 64 to non-rotatably secure the rod 24 and the spool 16 together. The pin is formed of spring material to also preclude any longitudinal movement between the rod 24 and the spool 16.

As is more specifically seen by reference to FIG. 5, the flange 34 is formed in such a manner that it substantially conforms to the configuration of the slot 56 formed in the plate 52. As will now become clear, if the plate means 30 is rotated as shown by the arrow 68 through 90° in either direction, the plate means along with the links 36 and 38 can be readily detached from the rod 24.

Reference is now made to FIGS. 6 through 8 showing an alternative embodiment of the attaching mechanism. The various numerals utilized previously are utilized again for the same or similar parts. New numerals are applied only to those parts having differences. As is illustrated in FIGS. 6 through 8, the spacing between the plates 70 and 72 is accomplished by providing spacers 74 and 76 disposed between the plates 70 and 72 at the opposite ends thereof. The thickness of the spacers along with the thickness of the plates 70 and 72 provides a dimension which is greater than the dimension between the inner faces of the flanges 32 and 34. As was described above, such dimensioning provides a spring tension in a relatively simple manner to retain the plate means on the rod 24 in a non-backlash configuration.

As is specifically illustrated in FIGS. 7 and 8, the slot defined by the plates 70 and 72 as is illustrated at 80 and 78, respectively, is disposed transverse of the longitudinal axis of the plates. However, the overall operation is essentially the same in that by rotation of the plates as illustrated by the arrow 82 through 90', the plates along with the rods 36 and 38 permanently affixed thereto may be removed from the rod 24.

In constructing the structure as above described the opening 64 would be formed through the spool and spool link and pin 66 would be inserted in place. The LVDT links would then be permanently affixed to the plate means with the appropriate space provided therebetween in either of the manners above described. The cores 40 and 42 would next be applied to the links 36 and 38. Thereafter the plate means would be positioned in such a manner as to cause the flange 34 to pass through the openings defined in the plate means and the plate means would be depressed at their center portion to allow the plate means to be turned through an angle of 90°. At this point the means depressing the plate means would be removed, allowing the plate means to spring outwardly thus locking the plate means onto the rod 24. Thereafter, the LVDT housing with the coils disposed therein would be fitted over the cores 40 and 42 and would then be locked in place by fastening means such as the bolts 84 and 86 as shown in FIG. 2.

If a requirement for disassembling a structure of the type above described occurred, those skilled in the art will immediately recognize that such can be readily and easily accomplished in a non-destructive manner. Such can occur simply by removing the LVDT housing, depressing the plates to relieve the tension, rotating them through 90° and removing them from the flange 34. In this fashion new cores and LVDTs or a different type of transducer may then be applied should such be required.

There has thus been disclosed an attachment mechanism for use with an electrohydraulic servovalve to connect the same to a plurality of transducer means in a simple, inexpensive and easily assembled manner.

What is claimed is:

1. Multi-position attachment between a plurality of transducers and a single driving element for use with an electrohydraulic servovalve comprising:
   a rod for attachment to said driving element;
   plate means removably centrally attached to said rod; and
   link means permanently affixed at each end of said plate means for attachment to said transducer.

2. Multi-position attachment as defined in claim 1 wherein said plate means defines an elongated slot disposed centrally thereof and said rod at one end defines a groove having a first dimension and bounded at the terminus of said rod by a flange conforming substantially to the dimensions of said slot so that said flange may be inserted through said slot and then turned 90° to attach said rod to said plate means.

3. Multi-position attachment as defined in claim 2 wherein said plate means includes a pair of plates spaced apart at said slot by an amount such that the thickness of said pair of plates and said space defines a second dimension which is greater than said first dimension when said plate means is not attached to said rod, said space being diminished to turn said flange.

4. Multi-position attachment as defined in claim 3 wherein the central portions of each of said pair of plates is offset with respect to the ends thereof to obtain said spaced apart configuration.

5. Multi-position attachment as defined in claim 3 which further includes first and second spacer means inserted between said pair of plates at opposite ends thereof respectively to obtain said spaced apart configuration.

6. Multi-position attachment as defined in claim 3 which further includes means for non-rotatably attaching said rod to said driving element at the end thereof opposite said flange.

7. Multi-position attachment as defined in claim 6 wherein said means for non-rotatably attaching includes a transverse opening defined jointly by said rod and said driving element and a cross pin received by said opening.

8. Multi-position attachment as defined in claim 3 wherein said drive element is a spool valve and said transducers are LVDTs.

* * * * *